United States Patent [19]

Nusbaum

[11] Patent Number: 5,202,537
[45] Date of Patent: Apr. 13, 1993

[54] UNDERFLOOR CABLE DISTRIBUTION SYSTEM WITH INCREASED TRENCH CAPACITY

[75] Inventor: Arthur Nusbaum, Fort Lee, N.J.

[73] Assignees: Robert Nusbaum; Howard Nusbaum, both of New York, N.Y.; Barbara Selick, Teaneck, N.J.

[21] Appl. No.: 699,319

[22] Filed: May 13, 1991

[51] Int. Cl.⁵ .............................................. H02G 3/28
[52] U.S. Cl. ...................................................... 174/48
[58] Field of Search ........................ 174/48, 49; 52/221

[56] References Cited

U.S. PATENT DOCUMENTS

| | | | |
|---|---|---|---|
| 3,453,791 | 7/1969 | Fork | 174/49 X |
| 3,721,051 | 3/1973 | Fork | 174/49 X |
| 3,886,702 | 6/1975 | Fork | 174/49 X |
| 4,593,507 | 6/1986 | Hartman | 174/48 X |
| 4,682,456 | 7/1987 | Hartman et al. | 174/48 X |
| 4,781,001 | 11/1988 | Ryan | 174/48 X |

Primary Examiner—Leo P. Picard
Assistant Examiner—David A. Tone
Attorney, Agent, or Firm—Kirschstein, Ottinger, Israel & Schiffmiller

[57] ABSTRACT

An electrical junction box for supplying electrical power to a multiplexer or other device used in an underfloor cable distribution system is mounted remotely from a trench used to feed electrical cables to the system in order to increase trench capacity.

11 Claims, 2 Drawing Sheets

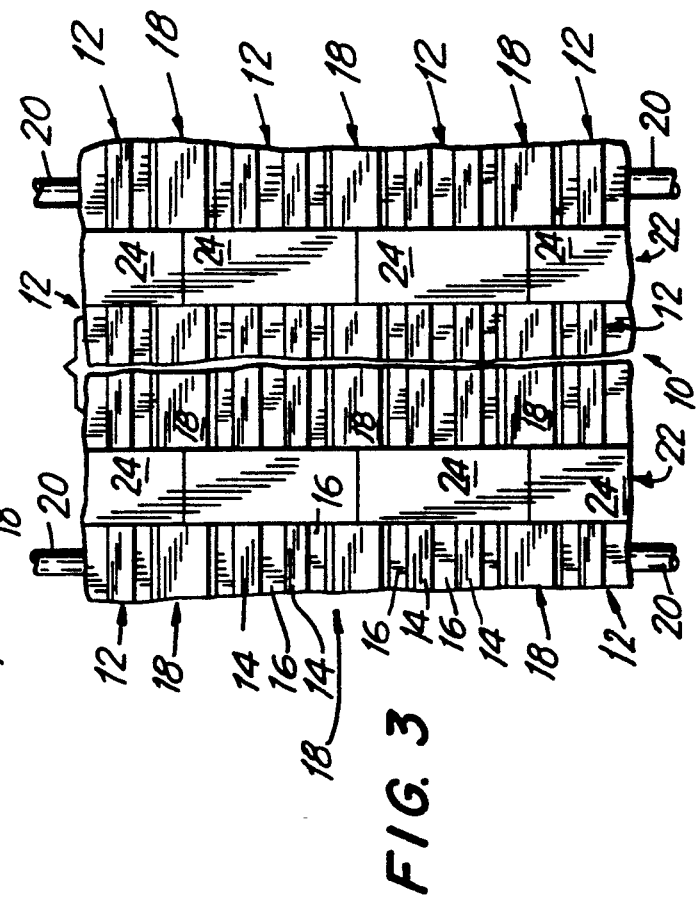
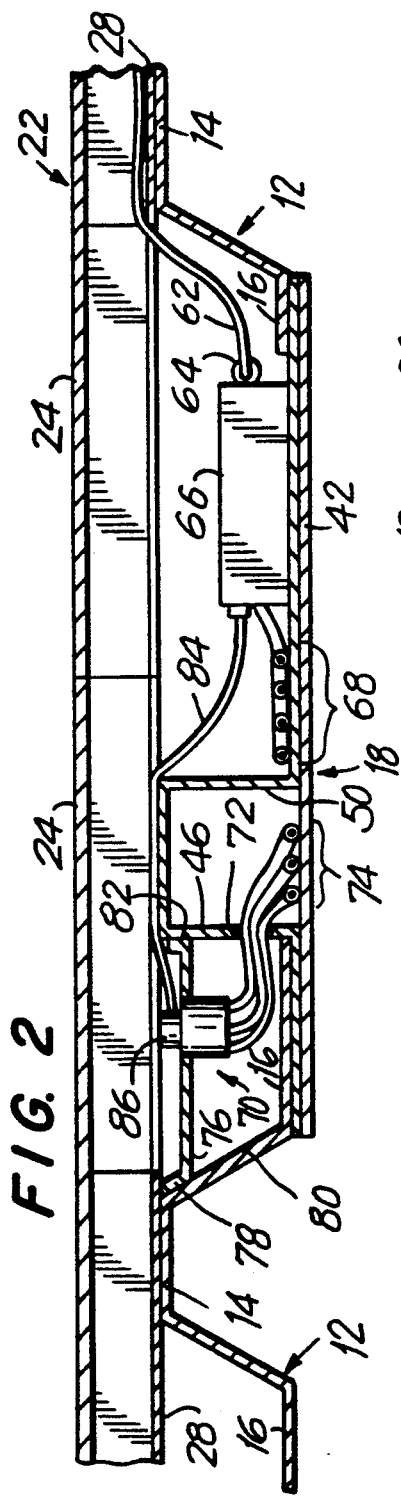
FIG. 2
FIG. 3

UNDERFLOOR CABLE DISTRIBUTION SYSTEM WITH INCREASED TRENCH CAPACITY

BACKGROUND OF THE INVENTION

1. Field of the Invention

This invention generally relates to an underfloor cable distribution system for a building and, more particularly, to increasing the capacity of a trench employed to feed electrical cables to the system.

2. Description of Related Art

A variety of underfloor cable distribution systems have been proposed in the art. See, for example, U.S. Pat. Nos. 3,721,051; 3,426,802 and 3,453,791. Also, see my own U.S. Pat. Nos. 4,558,546; 4,559,749; 4,580,379 and 4,625,480.

As described in my previous patents, it is known for the construction of an "electrified floor" to lay a plurality of longitudinally-extending, corrugated, metal flooring units side by side with a plurality of longitudinally-extending, metal, cable distribution ducts. The flooring units and the distribution ducts are supported by structural floor beams. A plurality of trenches rest on top of, and are connected to, the flooring units and the distribution ducts. Each trench extends transversely from an electrical power/communications closet to each duct. After the assembly has been completed, concrete is poured over the flooring units and the distribution ducts so as to be level with the tops of the trenches. Removable covers are kept on the trenches during the pouring of the concrete to prevent the concrete from entering the trenches.

Each trench has a power cell in which electrical cables are laid, as well as one or more additional non-power cells in which communication cables (e.g. telephone, analog signals) or data cables (e.g. computer, facsimile machines, digital signals) are laid. The power cells are physically separated and electrically insulated from the non-power cells. Similarly, each trench has separate power cells and non-power cells.

At each intersection of a trench with a duct, the power cells are in open communication with each other so that electrical power cables can be routed from the closet along the trench to and along a distribution duct. The non-power cells are also in open communication with each other so that the communication cables and/or the data cables can be routed from the closet along the trench to and along a distribution duct. The distribution ducts are typically spaced apart about 4 ft. center-to-center. Access to any one or all of the cables at any particular location along a distribution duct is typically obtained by drilling a single hole through the concrete floor into the duct, and by pulling the power/and or the communication and/or the data cables through the hole to a service fitting that is either elevated above the floor or mounted flush with the floor.

With the advent of the electronic office having more and more workstations per square foot of floor space, including computers, telephones, facsimile machines and analogous electronic equipment, the trenches have literally become clogged with cables. To help alleviate the congestion inside the trenches, local area network (LAN) support devices, also known as multiplexers, have been installed inside the distribution duct at strategically selected intersections with the trenches. This helps reduce the number of long, individual cable runs to the closet.

Many such multiplexers require a source of electrical power and, to that end, an electrical junction box is provided at each such strategic location where a multiplexer is to be installed. The junction box is tapped off the power cell in the distribution duct at the intersection, and extends physically into the trench.

With the ever-increasing demand for more and faster workstations, the multiplexers have increased in the number of their outputs and in size. The ever-physically-larger growing multiplexer in the distribution duct at a strategic intersection is beginning to encroach the trench. The junction box already in the trench, together with the multiplexer encroaching the trench, has decreased the capacity of the trench to carry more and more cables—a drawback which the present invention is intended to overcome.

SUMMARY OF THE INVENTION

1. Objects of the Invention

It is a general object of this invention to increase the capacity of a trench used in underfloor cable distribution systems.

It is another object of this invention to enable larger and/or additional multiplexers to be used in existing underfloor cable distribution systems without decreasing the area available for other uses.

2. Features of the Invention

In keeping with these objects, and others which will become apparent hereinafter, one feature of this invention resides, briefly stated, in an underfloor cable distribution system for a building, which system comprises a plurality of elongated, corrugated, metal flooring units extending along a longitudinal direction, and a plurality of elongated, metal, cable distribution ducts extending along the longitudinal direction in a side-by-side relationship with the flooring units.

At least one elongated, metal, cable trench extends along a transverse direction generally normal to the longitudinal direction over and across the flooring units, and also over and across the distribution ducts at intersections. Each duct and trench has power cells in open communication with each other at the intersections. Electrical power cables are routed along the trench to the ducts. Each duct and trench also has cable cells in open communication with each other at the intersections. Communication and data cables are routed along the trench to the distribution ducts. The power cells are separated from the cable cells to maintain the power cables apart from the communication and data cables.

An electrically powered device, e.g. a multiplexer, is mounted at at least one of the intersections. The device has an input for connection to one of the communication and data cables in the trench. The device has at least one output, and preferably a plurality of outputs, for connection to one of the communication and data cables in the duct at said at least one intersection.

In accordance with this invention, an electrical junction box for supplying electrical power to the device is mounted remotely from the trench on the duct at said at least one intersection to increase trench capacity. Preferably, the junction box is mounted below the trench, and is mounted remotely from the distribution duct at said at least one intersection. The junction box advantageously includes a duplex electrical receptacle having a pair of electrical outlets. The device has a power cord with a side plug for reception into one of the outlets, the side plug providing a low profile to the trench.

Each corrugated flooring unit has alternating crests and troughs. The junction box is mounted within an adjacent trough of an adjacent flooring unit.

By mounting the junction box remotely from the trench, the capacity of the trench is increased. Additional and/or larger multiplexers can be used without sacrificing the capacity of the trench to handle more cables.

The novel features which are considered as characteristic of the invention are set forth in particular in the appended claims. The invention itself, however, both as to its construction and its method of operation, together with additional objects and advantages thereof, will be best understood from the following description of specific embodimens when read in connection with the accompanying drawings.

BRIEF DESCRIPTION OF THE DRAWINGS

FIG. 2 is an enlarged, sectional view taken on line 2—2 of FIG. 1; and

FIG. 3 is a top plan view in reduced scale of an underfloor cable distribution system prior to the pouring of concrete thereover.

DETAILED DESCRIPTION OF THE PREFERRED EMBODIMENT

Figure 1:
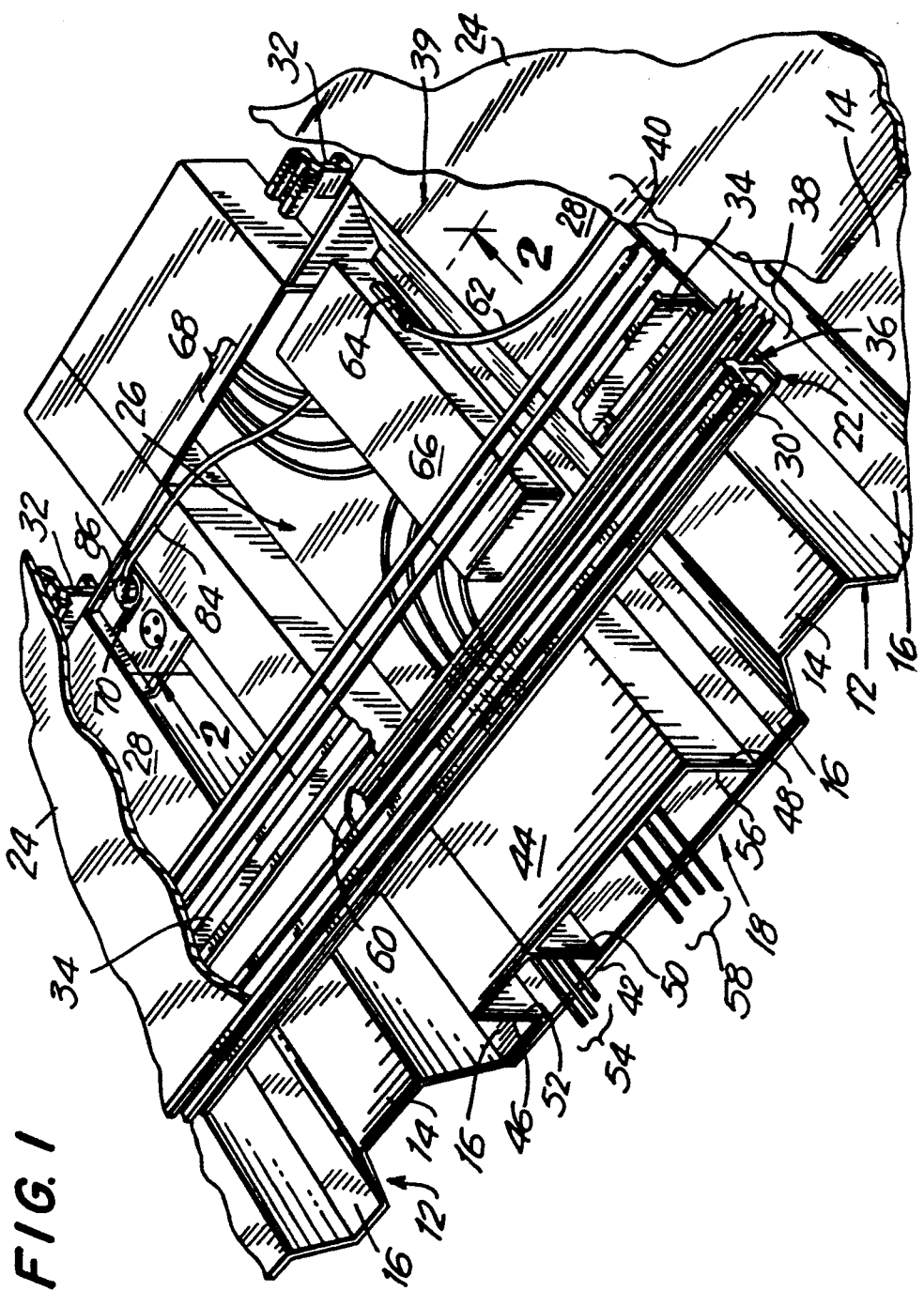
FIG. 1 is a cut-away, perspective view of an intersection of a trench and a distribution duct an underfloor cable distribution system according to this invention.

Referring now to the drawings, and particularly FIG. 3, reference numeral 10 generally identifies an underfloor cable distribution system comprising conventional, corrugated, metal flooring units 12 having alternating flat crests 14 and flat troughs 16. The flooring units 12 are joined edge-to-edge in a conventional manner to metal distribution ducts 18 which extend along the same longitudinal direction as the flooring units 12. The flooring units 12 and the distribution ducts 18 alternate with each other, and are all supported by structural beams 20 of a floor in a conventional manner. In a preferred embodiment, the ducts 18 are about 18" wide and are spaced apart about 4 ft. center-to-center.

At least one cable trench 22, and preferably a plurality of cable trenches 22 rests on top of the flooring units 12 and the ducts 18. Each trench 22 is made of metal and is typically tack-welded or bolted to the flooring units and distribution ducts. Each trench 22 extends transversely over and across the units and the ducts. Each trench has removable covers 24 at each intersection 26 (see FIG. 1) between a respective trench and a respective duct. The removable covers 24 provide access to the duct at each intersection 26.

After the assembly has been completed, concrete is poured over the flooring units and the ducts so as to be level with the tops of the trenches 22. During the pouring, the covers 24 keep the concrete from entering the trenches.

As shown in FIG. 1, each trench includes a generally planar base 28 parallel to the generally planar top covers 24, a pair of profiled side walls 30, 32 extending upwardly from the base 28, and a divider 34 extending upwardly from the base 28 between the side walls 30, 32. The divider 34 and side wall 30 bound, together with the base 28 and the top covers 24, a power cell 36 in which electrical power cables 38 are laid. The divider 34 and side wall 32 bound, together with the base 28 and top covers 24, a non-power cable cell 39 in which communication and/or data cables 40 are laid.

As also shown in FIG. 1, each duct 18 includes a generally planar base wall 42, a generally planar top wall 44 parallel to the base wall 42, a pair of side walls 46, 48 extending upwardly from the base wall 42, and a partition 50 extending upwardly from the base wall 42 between the side walls 46, 48. The partition 50 and side wall 46 bound, together with the base and top walls 42, 44, a power cell 52 in which power cables 54 are laid. The partition 50 and side wall 48 bound, together with the base and top walls 42, 44, a non-power cell 56 in which communication and/or data cables 58 are laid.

The power cells 36, 52 are in open communication with each other at intersection 26 through a hole 60. The cables 38 from the closet run along the trench until they reach the hole 60 whereupon some of the cables, e.g. cables 54, are routed into the duct 18 toward the left side of FIG. 1, and others of the cables are routed into the duct 18 toward the right side of FIG. 1.

The non-power cells 39, 56 are also in open communication with each other at intersection 26. This is accomplished by removing the base wall 28 of the trench and the top wall 44 of the duct at the intersection 26. The cables 40 from the closet run along the trench until one of them, e.g. cable 62, is passed through the removed base 28 and the removed top wall 44 and is connected to an input 64 of a multiplexer 66 or analogous electrically powered device. The multiplexer 66 has multiple outlets and, in the illustrated case, has eight outlets. Four of the outlets are individually connected to the four cables 58 which are routed toward the left in FIG. 1, and the other four outlets are individually connected to additional cables 68 that are routed to the right in FIG. 1.

An electrical junction box 70 supplies electrical power to the device 66. As best shown in FIG. 2, the box 70 is mounted remotely from the trench 22, preferably below the trench, at intersection 26. The box 70 is mounted remotely from the duct 18 at the intersection 26. A cut-out 72 is formed in the side wall 46 of the power cell 52. Jumper wires 74 are spliced to the cables 54 and are routed through the cut-out 72 to the box 70.

A support plate 76 supports the box 70. The plate 76 has one bent end 78 tack-welded or bolted to an inclined side wall 80 of an adjacent flooring unit 12. The plate 76 has another end 82 tack-welded or bolted to the side wall 46. The box 70 is mounted in a hitherto-unused space between the inclined side wall 80 and the side wall 46. This space, which is an extension of the non-power cable cell 39, is closed off and isolated by the plate 76.

A power cord 84, which is connected to a power inlet of the multiplexer 68, is terminated with a low profile side plug 86. The remote mounting of the box, together with the low profile side plug 86, does not clog the trench, and increases the capacity thereof to handle additional cables. The power cord 84 may be an armored cable.

The box has dual outlets, the additional outlet being reserved for future uses.

It will be understood that each of the elements described above, or two or more together, also may find a useful application in other types of constructions differing from the types described above.

While the invention has been illustrated and described as embodied in an underfloor cable distribution system with increased trench capacity, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An underfloor cable distribution system for a building, comprising:
    (a) a plurality of elongated, corrugated, metal flooring units extending along a longitudinal direction;
    (b) a plurality of elongated, metal, cable distribution ducts extending along the longitudinal direction in a side-by-side relationship with the flooring units;
    (c) at least one elongated, metal, cable trench extending along a transverse direction generally normal to the longitudinal direction over and across the flooring units, and also over and across the distribution ducts at intersections;
    (d) each distribution duct and cable trench having power cells in open communication with each other at the intersections, for routing electrical power cables along the trench to the distribution ducts, and also having cable cells in open communication with each other at the intersections, for routing communication and data cables along the trench to the distribution ducts, said power cells being separate from the cable cells to maintain the power cables apart from the communication and data cables;
    (e) an electrically-powered device mounted at at least one of the intersections, said device having an input for connection to one of the communication and data cables in the trench, and at least one output for connection to one of the communication and data cables in the duct at said at least one intersection; and
    (f) an electrical junction box for supplying electrical power to the device, said junction box being mounted remotely from the trench and being located at said at least one intersection to increase trench capacity.

2. The underfloor system according to claim 1, wherein the device is a multiplexer having a single input and multiple outlets.

3. The underfloor system according to claim 1, wherein each distribution duct has a generally planar base wall, a generally planar top wall parallel to the base wall, side walls extending between and interconnecting the base and top walls, and at least one partition wall between the side walls, said partition wall bounding the power cell of the duct with one of the side walls, and bounding the cable cell of the duct with the other of the side walls.

4. The underfloor system according to claim 3, wherein each trench has a generally planar base, a generally planar top parallel to the base, sides extending between and interconnecting the base and the top, and at least one divider between the sides, the divider bounding the power cell of the trench with one of the sides, and bounding the cable cell of the trench with the other of the sides.

5. The underfloor system according to claim 4, wherein the base of the trench directly rests on the top wall of each distribution duct, and wherein the open communication between the power cells of the trench and each distribution duct is provided by a hole extending through the base of the trench and the top wall of a respective distribution duct at a respective intersection.

6. The underfloor system according to claim 5, wherein the open communication between the cable cells of the trench and each distribution duct is provided by an opening extending through the base of the trench and the top wall of a respective distribution duct at a respective intersection.

7. The underfloor system according to claim 1, wherein the junction box is mounted below the trench.

8. The underfloor system according to claim 1, wherein the junction box is mounted remotely from the distribution duct and is located at said at least one intersection.

9. The underfloor system according to claim 1, wherein the duct at said at least one intersection is situated adjacent one of the corrugated flooring units having an adjacent crest and an adjacent trough, and wherein the junction box is mounted within the adjacent trough.

10. The underfloor system according to claim 1, wherein the junction box includes a duplex electrical receptacle having a pair of electrical outlets.

11. The underfloor system according to claim 1, wherein the junction box has an electrical outlet, and wherein the device has a power cord with a side plug for reception into the outlet.

* * * * *